US008117454B2

(12) United States Patent
Forsberg

(10) Patent No.: US 8,117,454 B2
(45) Date of Patent: Feb. 14, 2012

(54) FAST UPDATE MESSAGE AUTHENTICATION WITH KEY DERIVATION IN MOBILE IP SYSTEMS

(75) Inventor: Dan Forsberg, Helsinki (FI)

(73) Assignee: Nokia Corporation, Espoo (FI)

( * ) Notice: Subject to any disclaimer, the term of this patent is extended or adjusted under 35 U.S.C. 154(b) by 1227 days.

(21) Appl. No.: 11/790,913

(22) Filed: Apr. 27, 2007

(65) Prior Publication Data
US 2008/0207168 A1 Aug. 28, 2008

(30) Foreign Application Priority Data

Feb. 23, 2007 (FI) ...................................... 20070157

(51) Int. Cl.
H04L 9/32 (2006.01)
H04M 1/66 (2006.01)
H04M 1/68 (2006.01)
H04M 3/16 (2006.01)
H04W 36/00 (2009.01)
H04K 1/00 (2006.01)

(52) U.S. Cl. ........ 713/176; 713/170; 455/410; 455/436; 380/270; 380/272

(58) Field of Classification Search .................. 455/410; 713/170, 176
See application file for complete search history.

(56) References Cited

U.S. PATENT DOCUMENTS

| 6,760,444 | B1 * | 7/2004 | Leung | 380/270 |
| 7,298,847 | B2 * | 11/2007 | Jing et al. | 380/247 |
| 7,409,544 | B2 * | 8/2008 | Aura | 713/162 |
| 7,475,241 | B2 * | 1/2009 | Patel et al. | 713/155 |
| 7,493,652 | B2 * | 2/2009 | Aura | 726/2 |
| 7,639,802 | B2 * | 12/2009 | Gundavelli et al. | 380/44 |
| 7,813,511 | B2 * | 10/2010 | Leung et al. | 380/281 |
| 7,907,948 | B2 * | 3/2011 | Haddad et al. | 455/436 |
| 2002/0114469 | A1 * | 8/2002 | Faccin et al. | 380/270 |
| 2002/0120844 | A1 * | 8/2002 | Faccin et al. | 713/168 |
| 2003/0147537 | A1 * | 8/2003 | Jing et al. | 380/277 |
| 2003/0211842 | A1 * | 11/2003 | Kempf et al. | 455/411 |
| 2005/0044362 | A1 * | 2/2005 | Haddad et al. | 713/170 |
| 2005/0237983 | A1 | 10/2005 | Khalil et al. | |
| 2005/0262355 | A1 * | 11/2005 | Banet et al. | 713/180 |
| 2006/0227971 | A1 * | 10/2006 | Haddad | 380/247 |
| 2006/0240825 | A1 * | 10/2006 | Funabiki et al. | 455/436 |

(Continued)

OTHER PUBLICATIONS

S. Gundavelli et al., "*Proxy Mobile IPv6*", MIP6 WG, Oct. 16, 2006, pp. 1-22.

(Continued)

*Primary Examiner* — Christian Laforgia
(74) *Attorney, Agent, or Firm* — Harrington & Smith

(57) ABSTRACT

The present invention performs a Binding Update or a Location Update message authentication independently and terminal-specifically in a home SAE gateway. A key, which is derived in a home AAA server from an initially set long term key, is given to a visited network for encrypting the update messages in Proxy Mobile IP. In Client Mobile IP, the key is transmitted to a mobile node for update message encryption. When the update message is received in the home SAE gateway, the key can be derived independently in the home SAE gateway without any key requests between the gateway and the home AAA server. Thus, it is possible to authenticate the binding or location update messages by verifying the two signatures. The present invention can also be implemented on a lower hierarchy of the system. The invention can be implemented in 3GPP standard releases enhanced with LTE technology, for instance.

29 Claims, 4 Drawing Sheets

U.S. PATENT DOCUMENTS

| | | | | |
|---|---|---|---|---|
| 2006/0291422 A1* | 12/2006 | Rochford | | 370/331 |
| 2007/0037553 A1* | 2/2007 | Patel et al. | | 455/410 |
| 2007/0113075 A1* | 5/2007 | Jo et al. | | 713/158 |
| 2007/0189250 A1* | 8/2007 | Haddad et al. | | 370/338 |
| 2007/0260884 A1* | 11/2007 | Venkitaraman et al. | | 713/169 |
| 2007/0297377 A1* | 12/2007 | McCann et al. | | 370/338 |
| 2008/0127317 A1* | 5/2008 | Nakhjiri | | 726/6 |

OTHER PUBLICATIONS

International Search Report, PCT/FI2008/050081 filed Jun. 5, 2008.

* cited by examiner

FAST UPDATE MESSAGE AUTHENTICATION WITH KEY DERIVATION IN MOBILE IP SYSTEMS

BACKGROUND OF THE INVENTION

1. Field of the Invention

The invention generally relates to telecommunications. More specifically, the invention relates to Proxy Mobile IP and Client Mobile IP Binding Update authentication or location update message authentication, by using security key derivation.

2. Description of the Related Art

In mobile systems security is an essential issue in network and mobile terminal functionalities. Because mobile terminals may roam freely in different networks, it is necessary to establish trusted relationships between the mobile terminals and the networks, which are currently serving the mobile terminals. The trusted relationship requires that the mobile terminal and the visited network have performed mutual authentication and that they are prepared to use data encryption and integrity protection. As a mobile terminal roams in different networks there may arise a need to establish a security association from the mobile terminal to a gateway, which provides access to a network already trusted by the mobile terminal. The network that is already trusted, may be a corporate Intranet, for instance. The network that is trusted may also be an Internet segment via which it is possible to establish a trusted connection to a remote client or a remote network, which again may be a corporate Intranet, for instance.

The establishment of Security Associations between two hosts, between a host and a security gateway or between two security gateways is discussed in the Internet Engineering Task Force (IETF) IP security architecture standard (IPsec). Issues and proposals relating to the Internet technologies are available in Request for Comments (RFC) documents. Some of the proposals available as RFC documents are adopted in the eventual standards.

Document Gundavelli et al.: 'Proxy Mobile IPv6', MIP6 Working Group, Oct. 16, 2006, discloses issues in Proxy Mobile IPv6 protocol operation. Gundavelli focuses to a network-based mobility management by handling message formats, Home Agent's and Proxy Mobile Agent's tasks and messaging between these functional elements. Furthermore, AAA (Authentication, Authorization and Accounting) protocol and Binding Updates (BU) as location update messages for the user terminals are discussed. Known AAA protocols are 'RADIUS' (Remote Authentication Dial In User Service) and its upgraded version 'DIAMETER', for example.

Generally, TMSI (Temporary Mobile Subscriber Identity) describes identity data for a specific mobile terminal in a specific location of the network. The network is able to change the TMSI if this is for some reason desired. The most common use for the TMSI data is the paging of the terminal. Generally in GPRS systems, P-TMSI (Packet TMSI) is allocated for confidential identification of the terminal for services provided through a SGSN (Serving GPRS Support Node) P-TMSI consists of 32 bits.

In LTE (Long Term Evolution) specifications, S-TMSI corresponds to the P-TMSI. In this case, S-TMSI is a temporary identity for a terminal which is provided from the user equipment to a MME (Mobility Management Element).

A mobile node's current location while the mobile is away from its home network, can be described with a care-of address, which is a globally routable address. The home address of the mobile node is a permanent IP address as with any kinds of nodes connected to the network. The association of the mobile node's home address with the care-of address, along with the remaining lifetime of that association, is known as a binding.

Furthermore, mobile station's identity is presented to the network in the form of a Network Access Identifier (NAI) as a part of the access authentication procedure. After a successful authentication, the proxy mobile agent will have the profile of the mobile station.

A Home Agent (HA) maintains a record of the current binding of the mobile node, when the terminal is away from its home network. There are two new Ipv6 destination options for allowing the HA of the mobile node and correspondent nodes learn and cache the binding for the mobile node. After configuring a new care-of address, the mobile node must send a Binding Update (BU), which contains that care-of address and which is sent to the HA. The BU might also be sent to other correspondent nodes if out-of-date care-of address data is present in their binding cache. Receipt of the Binding Update is confirmed by sending a Binding Acknowledgement in return.

Home network also includes a Home AAA Server (AAAH) which is able to check credentials originating from mobile nodes administered by that home network. The AAAH thus provides authentication of the user terminals. Furthermore in prior art, the AAAH provides the security keys for authenticating the Binding Updates.

The problem in the prior art is that the request for key and its response message must be submitted from the HA to the AAAH server each time when a new terminal connects to the network. The problem is finding a way of getting rid of these two messages between the HA and the AAAH. Thus, in the prior art, the update message (such as the Binding Update) authentication is not performed in the most simple nor the quickest available manner.

SUMMARY OF THE INVENTION

A first aspect of the present invention is a method in which an update message signing key is derived at first. After that the update message signing key is transmitted to a visited network or to a mobile node for signing an update message. Thereafter a signed update message is received. This is followed by deriving an authentication key. Finally the authenticity of the received update message is verified by comparing the received signature with a signature of the authentication key.

A second aspect of the present invention is an apparatus in which a signing key generator is configured to derive an update message signing key, and a key transmitter is configured to transmit the update message signing key to a visited network or to a mobile node.

A third aspect of the present invention is an apparatus in which an update message receiver is configured to receive a signed update message. Furthermore, an authentication key generator is configured to derive an authentication key, and an authentication verifier is configured to verify the authenticity of the received update message by comparing the received signature with a signature of the authentication key.

A fourth aspect of the present invention is a computer program embodied on a computer readable medium, wherein the computer program is controlling a data-processing device to perform the deriving of an update message signing key, and the transmitting of the update message signing key to a visited network or to a mobile node for signing an update message.

A fifth aspect of the present invention is a computer program embodied on a computer readable medium, wherein the computer program is controlling a data-processing device to perform the receiving of a signed update message, the deriving of an authentication key, and the verifying of the authenticity of the received update message by comparing the received signature with a signature of the authentication key.

A sixth aspect of the present invention is a method in which an update message signing key is derived, the update message signing key is transmitted to a visited network or to a mobile node for signing an update message, a signed update message is received in a home system architecture evolution gateway, an authentication key is derived in the home system architecture evolution gateway, and the authenticity of the received update message is verified by comparing the received signature with a signature of the authentication key.

A seventh aspect of the present invention is a home authentication, authorization and accounting server in which a signing key generator is configured to derive an update message signing key, and a key transmitter is configured to transmit the update message signing key to a visited network or to a mobile node.

An eighth aspect of the present invention is a home system architecture evolution gateway in which an update message receiver is configured to receive a signed update message, an authentication key generator is configured to derive an authentication key, and an authentication verifier is configured to verify the authenticity of the received update message by comparing the received signature with a signature of the authentication key.

In an embodiment of the invention, in the method according to the first aspect, said signed update message is received in a home agent. Furthermore, said authentication key is derived in a home agent.

In an embodiment of the invention, in the method according to the first aspect, said signed update message is received in a local data gateway. Furthermore, said authentication key is derived in a local data gateway.

In an embodiment of the invention, in the method according to the first aspect, a new authentication key is derived for each connecting user terminal.

In an embodiment of the invention, in the method according to the first aspect, said update message signing key is derived in a home authentication, authorization and accounting server.

In an embodiment of the invention, in the method according to the first aspect, said update message signing key is derived in a mobility management element.

In an embodiment of the invention, in the method according to the first aspect, said update message signing key is derived based at least on a long term key, a key derivation function and user terminal identification data. In an embodiment of the invention, in the method according to the first aspect, said authentication key is derived based at least on a long term key, a key derivation function and user terminal identification data. In an embodiment of the invention, the user terminal identification data is a temporary mobile subscriber identity.

In an embodiment of the invention, in the method according to the first aspect, the signed update message is received from a first access point or from a first mobile node. In a further embodiment of the invention, a user terminal is connected to a second access point as a second mobile node, and the update message signing key is transmitted from the first access point to the second access point or from the first mobile node to the second mobile node or from a first local data gateway to a second local data gateway, for signing the update message.

In an embodiment of the invention, in the method according to the first aspect, the signed update message is received from a local data gateway.

In an embodiment of the invention, in the method according to the first aspect, the update message is a binding update message.

In an embodiment of the invention, in the method according to the first aspect, the update message is a location update message.

In an embodiment of the invention, in the apparatus according to the second aspect, the apparatus is a home authentication, authorization and accounting server.

In an embodiment of the invention, in the apparatus according to the second aspect, the apparatus is a mobility management element.

In an embodiment of the invention, in the apparatus according to the second aspect, the signing key generator is further configured to derive a new update message signing key for each connecting user terminal.

In an embodiment of the invention, in the apparatus according to the second aspect, the signing key generator is further configured to derive the update message signing key based at least on a long term key, a key derivation function and user terminal identification data.

In an embodiment of the invention, in the apparatus according to the second aspect, the key transmitter is configured to transmit the update message signing key to a first access point or to a local data gateway.

In an embodiment of the invention, in the apparatus according to the third aspect, the apparatus is a home agent.

In an embodiment of the invention, in the apparatus according to the third aspect, the apparatus is a local data gateway.

In an embodiment of the invention, in the apparatus according to the third aspect, the authentication key generator is further configured to derive a new authentication key for each connecting user terminal.

In an embodiment of the invention, in the apparatus according to the third aspect, the authentication key generator is further configured to derive the authentication key based at least on a long term key, a key derivation function and user terminal identification data.

In an embodiment of the invention, in the apparatus according to the third aspect, the update message receiver is configured to receive the signed update message from a first access point, from a second access point, from a first mobile node, from a second mobile node, from a first local data gateway or from a second local data gateway.

The most relevant advantage of the present invention is the fact that the Home Agent is able to authenticate the Binding Update or Location Update independently without messaging over and over again with the AAAH. In the situation where a new terminal enters and a new Binding Update or Location Update is received in the HA, there is no need for requesting the keys from the AAAH. Therefore, the authentication procedure of the BU's signature is accelerated. Furthermore, the AAAH will become more scalable because it is not any more dependent on the number of update messages received in the HA.

A further advantage is that there is no need to store the keys in a memory. Each time an update message is received, the keys are derived in the Home Agent or in a User Plane Entity (UPE). Thus, only a long term key has to be maintained in the HA and in the AAAH. Furthermore, one advantage is that the invention is invisible to the proxy mobile node (in case of PMIP) and to the user terminal (in case of CMIP), thus requiring no further processing in them during the implementation of the invention.

DETAILED DESCRIPTION OF THE PREFERRED EMBODIMENTS

Reference will now be made in detail to the embodiments of the present invention, examples of which are illustrated in the accompanying drawings.

Figure 1:
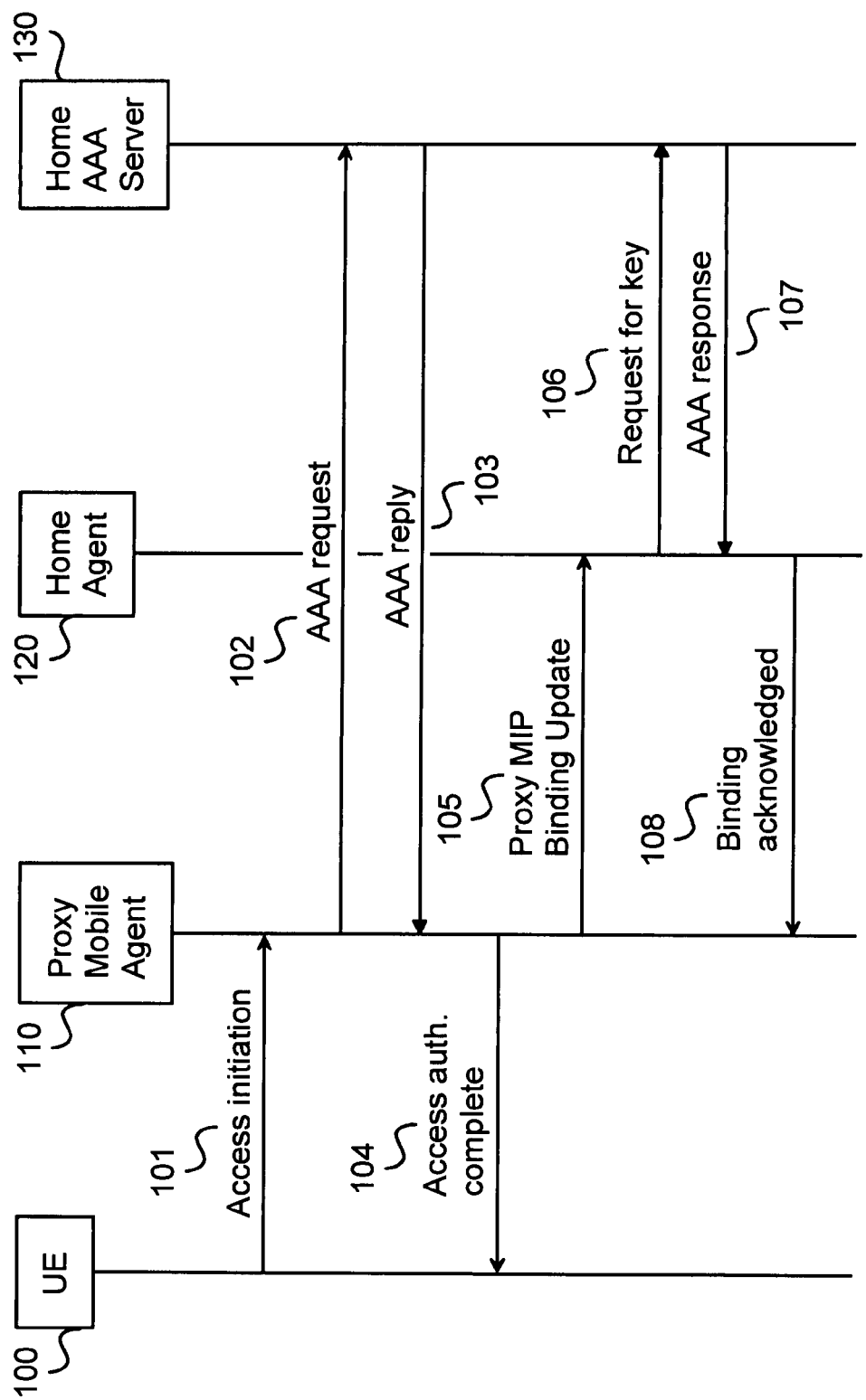
FIG. 1 illustrates the signal flow diagram concerning the BU authentication in the prior art.

FIG. 1 shows an embodiment of the present invention where a signaling diagram is illustrated. In FIG. 1, only essential signalling concerning the invention is shown.

Concerning a part of the signal flow in the Proxy Mobile IPv6 operation according to the prior art, a signal flow diagram in FIG. 1 shows steps relating to authentication of the Binding Update. The shown functional components of the network are User Equipment (UE) 100, a Proxy Mobile Agent (PMA) 110, a Home Agent (HA) 120 and a Home AAA Server (AAAH) 130. At first, an access request is initialised by sending a request signal 101 from the user terminal 100 to the Proxy Mobile Agent 110. After that, the Proxy Mobile Agent 110 further sends the request to the AAAH server 130, the request being called as an AAA request 102. One main task of the AAA server is authentication and authorization of the user NAI in a roaming environment. The AAAH server 130 also interacts with the Foreign Agent and the other AAA servers for providing authorizing, authentication and accounting services for the mobile user.

When the mobile station 100 is authenticated in the AAAH 130, it sends an AAA reply 103 back to the Proxy Mobile Agent 110. In such a way, the profile of the mobile node 100 is obtained in the Proxy Mobile Agent 110. The user terminal 100 is informed with the message 104 that the access authentication is completed.

The PMIP Binding Update registers the current anchor point and creates a binding cache entry and a tunnel route for the mobile station's home prefix. The PMIP Binding Update 105 is sent from the PMA 110 to the Home Agent 120. The BU is specific and distinct for each user terminal. In the case of a LTE system and Proxy Mobile IP, the BU originates from some network element such as an eNB or UPE. The BU has been signed by a key in that network element before the transmission.

The main task in this situation is the authentication of the Binding Update 105. In the prior art, this has been done by requesting the key information 106 from the AAAH server 130, which then sends the key information back 107 to the Home Agent 120. This has been compulsory because in the prior art the Home Agent is not capable of creating or deriving the key information independently. Thus, the key request and AAA response messages have correspondingly been indicated by messages 106 and 107 in FIG. 1. After the Binding Update has been validated, a binding acknowledgement message 108 is sent from the Home Agent 120 to the Proxy Mobile Agent 110.

Furthermore in prior art, in the case of the user terminal switching to another eNB, the procedure has been performed as follows. The AAAH sends the key to the User Plane Entity of the visited network, which can forward it to the eNB, which has a connection to the user terminal. In such a case, when the user terminal has connected to another eNB, the UE identifier is added and the Binding Update is signed by the keys specific to the user terminal, and the BU is sent from the UPE to the HA. The HA requests the keys from the AAAH and the AAAH sends them to the HA. The BU's signature is then authenticated using the requested keys and thus, the validity of the BU is confirmed.

Thus, the concept of a user data gateway means in this context e.g. either a home agent or a local data gateway. In one embodiment, the local data gateway is a User Plane Entity (UPE).

Figure 2A:
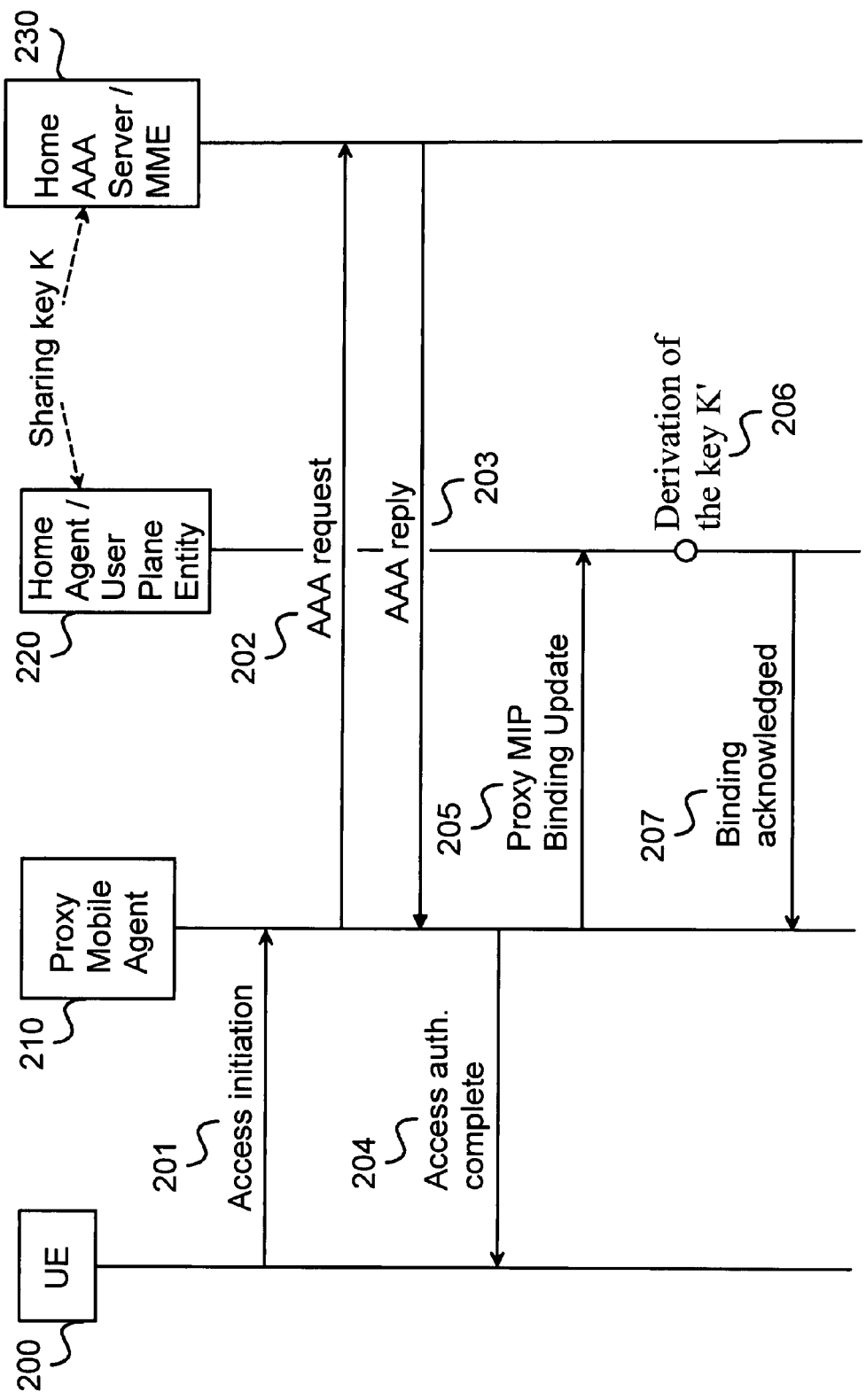
FIG. 2a illustrates the signal flow diagram concerning the BU authentication in an embodiment of the present invention.
Figure 2B:
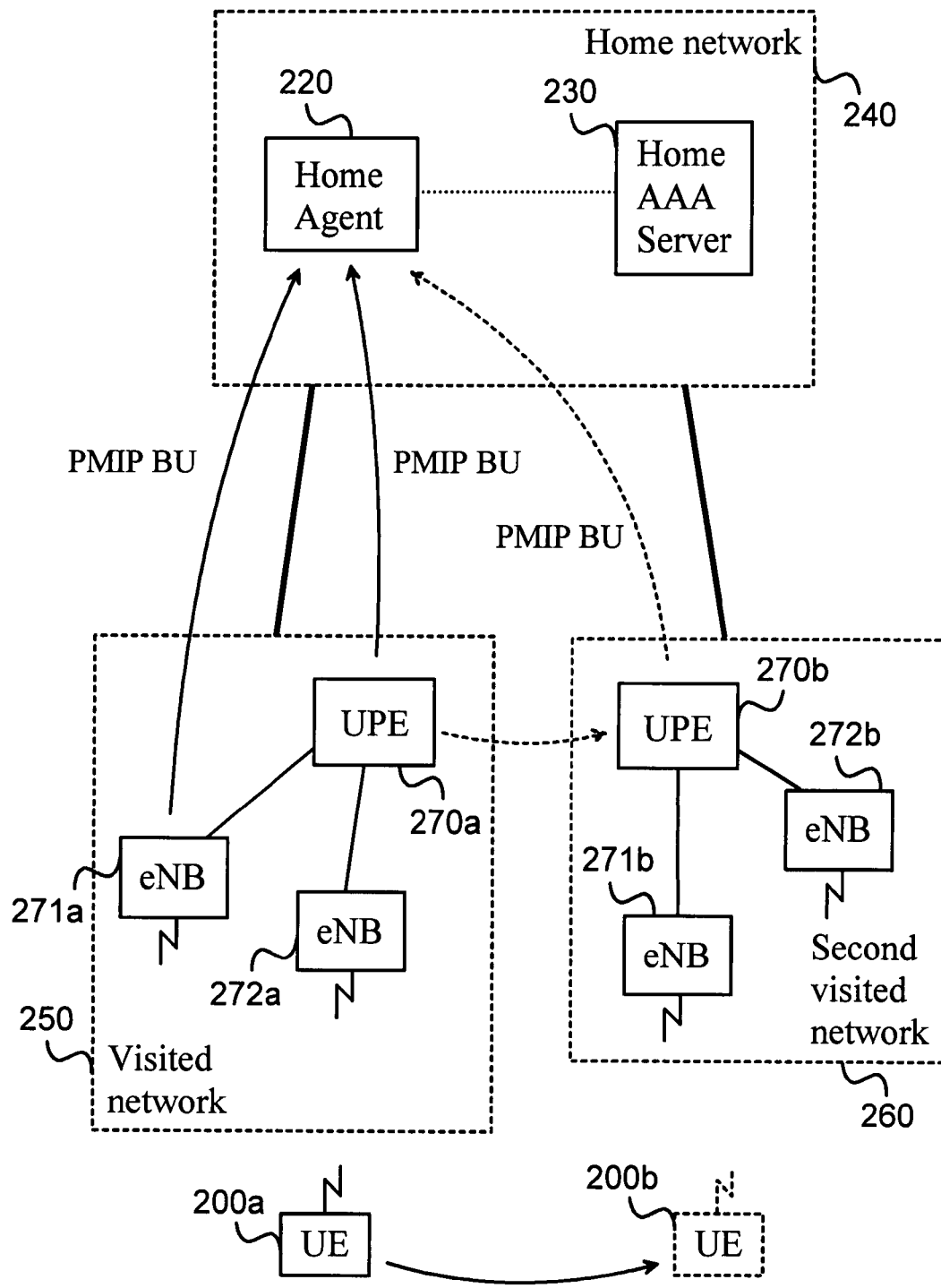
FIG. 2b illustrates an embodiment of the apparatus used in the present invention showing the functional blocks of a LTE system with an upper level realization of the BU authentication.

Reference is now made to FIGS. 2a and 2b for illustrating the signal flow and the apparatus in one embodiment of the invention. The user equipment (UE) 200, the Proxy Mobile Agent (PMA) 210, the Home Agent (HA) 220 and the Home AAA (AAAH) server 230 are similar entities as in FIG. 1. In FIG. 2a, the messages 201-204 are similar to the messages 101-104 of FIG. 1, correspondingly. The home network 240 includes the HA 220 and the AAAH server 230. Additionally, two visited networks are shown as an example, where the first visited network 250 includes a UPE 270a, and two eNBs 271a and 272a. The second visited network 260 includes a UPE 270b and two eNB:s 271b and 272b. It is emphasized that these entities represent only one possible example according to which the invention can be implemented.

In an embodiment of the invention, a long term key K is initially shared by the Home Agent 220 and the Home AAA server 230. The key K may have been set separately for both of these entities 220, 230. The Home AAA server 230 includes credentials and passwords of the home network's users and thus, also the information concerning the user terminal 200 is available there. Concerning the mobile IP system generally, the HA 220 provides a global and a visible IP address for the user equipment, which are used for reaching the user equipment 200.

The Proxy Mobile IP (PMIP) Binding Update 205 is sent for example from a e-Node B (eNB) 271a of the visited network 250 to the HA 220 in the home network 240. The PMIP BU can also be sent from the User Plane Entity (UPE) 270a of the visited network 250 to the HA 220. In other words, the BU can be sent by an access point (e.g. a proxy mobile node) of a visited network. The BU can include the mobile node's NAI, proxy mobile node's NAI identifier (which is the sender of the BU) and optionally an alternate care-of address. The BU has been signed by using a key.

In hierarchical PMIP, the eNB 271a, 271b updates the UPE 270a directly concerning the user terminals 200a connected to the eNB. When the user equipment moves to the area 200b of another UPE 270b, the corresponding UE location is updated also to the upper level of the hierarchy.

In the case of Client Mobile IP (CMIP), the Binding Update is sent by the user terminal (which can be called a mobile node), which has used a key for signing the BU before the transmission. These Binding Updates have to be verified because the sender must own a right to send the BU for a specific mobile terminal.

By further referring to FIGS. 2a and 2b according to an example of the invention, the key K is shared initially in the HA 220 and in the AAAH 230. It is notable that it is sufficient that the key K is transported only once for the use of both the AAAH 230 and the HA 220. When the UE 200a logs in to the network 250, the AAAH 230 derives a new key K' based on the key K. The procedure can also be implemented in a way that several new keys are created based on the key K and each of these derived keys (K', K", . . . ) is specific to the user terminal connected to the network. The derived key is defined as the authentication key for the Binding Update. The parameters in the key derivation may include the user equipment ID (UEid) and the Security Parameters Index (SPI). Furthermore, for replay protection purposes, an additional sequence number or random number may be used as a parameter in a case when the BU itself does not contain a sequence number. Also the global IP address of the terminal might be a parameter. Additional parameters can also be used to provide sufficient security level or alternative ways to identify the user equipment. With sequence numbering, it is possible to prevent man-in-the-middle type of attack, where the signal is caught and replayed later by a transceiver of an intruder. Because the sequence number will be hidden inside the signature, it is hard to be tampered by any attacker. After the key derivation in AAAH 230, the derived key K' is then transmitted to the UPE 270a. Some PMIP protocol values may also be given to the UPE 270a.

At the next stage, the UPE 270a signs the BU with the derived key K', adds the signature with the BU message and transmits the signed BU 205 to the Home Agent 220. The Home Agent 220 in turn picks up the initially and originally shared key K and the mobile node specific BU. The Home Agent 220 then derives the key K' 206 with the similar procedure like the AAAH's 230 key derivation procedure. Thus, the parameters in the key derivation include the key K, UEid, SPI, the key derivation function and possibly a sequence number, in one embodiment of the invention. After that the signature is calculated with the key K' derived in the Home Agent 220. The calculated signature and the received signature from the UPE 270a are compared with each other. If the signatures match with each other, the Binding Update 205 is valid and accepted, and a 'Binding Acknowledgement' message 207 will be sent.

In the case of a new terminal entering the network, the above described key derivation procedure can be repeated user-specifically. The procedure can also be repeated for each new Binding Update message.

Furthermore, the method according to the invention is not restricted to the binding update (BU) message only. The present invention can also be applied to a location update message. In that case, a location update message can be transmitted in a situation where a path or location is updated using any kind of mobility protocol. Both of these messages are referred in this context as update messages.

Figure 3:
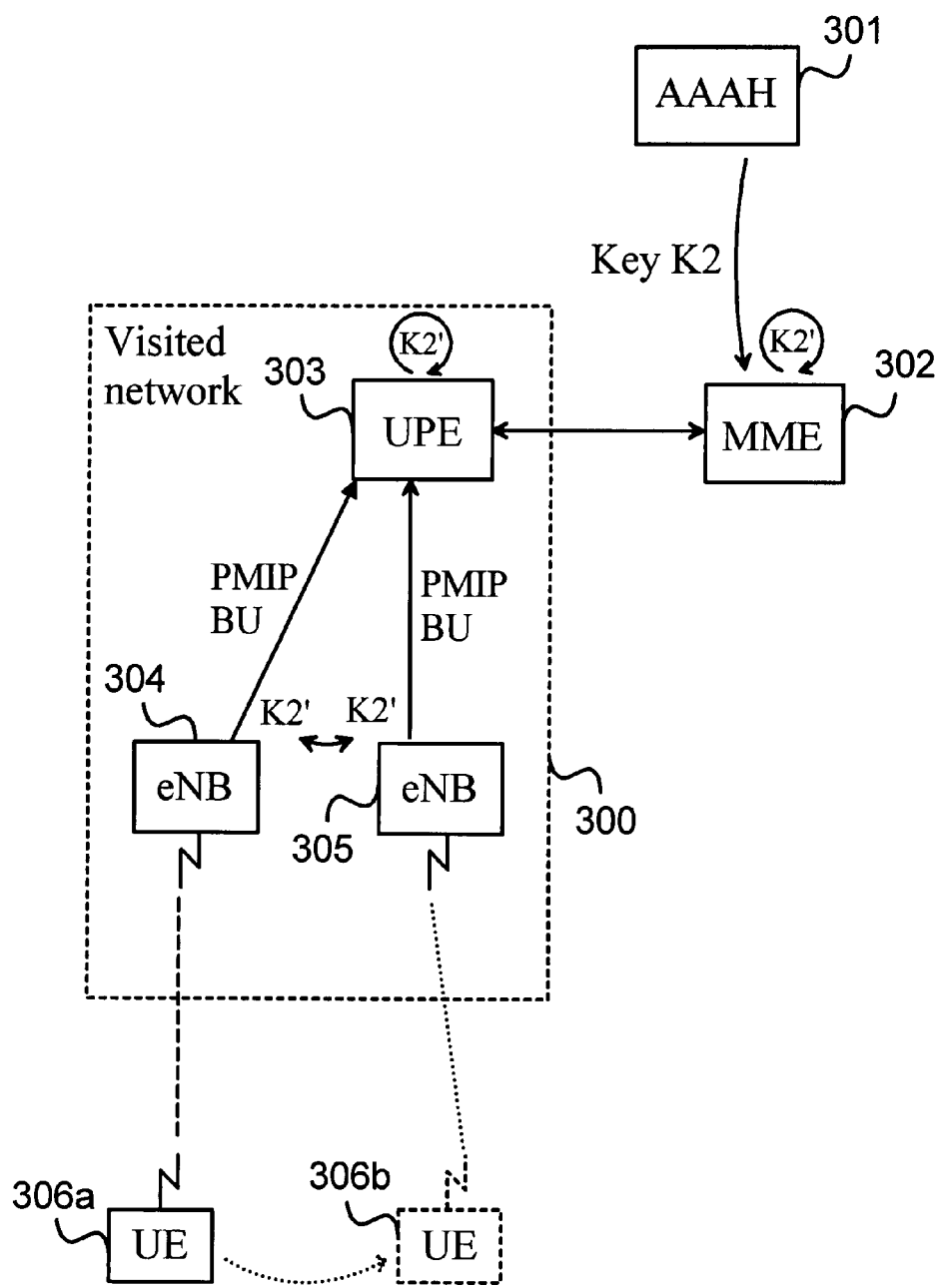
FIG. 3 illustrates an embodiment of the apparatus used in the present invention showing a lower level realization of the BU authentication.

As another embodiment of the invention, reference is made to FIG. 3 and also back in FIG. 2a. In that embodiment, the authentication procedure can be implemented in a lower level of the network structure. When the user terminal moves, the issue of handover emerges. In such a case when an LTE system is concerned, the UPE receives a request for switching the traffic from the previous eNB to the new eNB. There is a problem that the UPE must be able to verify the signed PMIP BU received from the eNB. The main concern is again that there might be an intruder between the eNB and the UPE which somehow corrupts the sent BU. Another possibility is that there might be a false eNB, which sends trash Binding Updates to the UPE trying for example a playback-type of attack in the network.

Thus, the situation is rather similar compared with the earlier described procedure but this time the BU authentication procedure is implemented in a lower level of the network hierarchy. In FIG. 3 there is a visited network 300. At this time, a common key, say K2, is initially available in the AAAH 301 and it is further distributed to the Mobility Management Element MME 302. The MME 302 is able to calculate a new key K2' based on the key K2, user equipment 306a identity data and a desired key derivation function. Additionally, a sequence number or a random number can be a parameter in the key derivation as mentioned earlier. The user equipment identity data is S-TMSI in an embodiment of the invention but it can also be some other user identity parameter. The key K2' is then used for encrypting the traffic between the UPE 303 and the eNB 304. More specifically, the MME 302 can derive user-specific keys based on the corresponding user identities. Referring to the signal flow in FIG. 2a, the MME is analogical to the entity 230. The derived keys are provided to the eNB:s 304, 305 for encrypting the PMIP BU:s by signing the BU:s with the corresponding key. Thus, the eNB-UPE traffic is encrypted concerning these location update messages. When the eNB is changed because of a new location for the specific UE 306b, the derived key K2' can be provided for the new eNB-UPE traffic concerning the Binding Updates. In other words, when the user terminal 306a moves to a new location 306b, it disconnects from a first access point 304 and connects to a second access point 305 (as a second mobile node in this context). Thereafter, the binding update signing key K2' can be forwarded from the first access point 304 to the second access point 305. The key K2' can also be directly transferred from the first mobile node to the second mobile node. Thereafter, the BU is signed by the key K2' in the second access point (eNB) 305 and then, the eNB 305 transmits the BU to the UPE 220, 303.

The rest of the procedure is performed in the similar manner as in the first embodiment. Summarising the above, the BUs are signed with the key K2' in the eNB. The signature is added to the BU and the signed BU is sent from the eNB to the UPE 220, 303. Referring to FIG. 2a, the eNB can be seen as the PMA 210 and the BU is sent 205 to the UPE 220. The UPE 220, 303 includes the same information as the MME 230, 302; that is, the key derivation function, the key K2 and the user identity information from the S-TMSI. The UPE 202, 303 calculates the key K2' independently and picks up the signature from the BU. With this information, the signature can be verified and thus, BU authentication is completed and the binding acknowledgement message 207 can be sent from the UPE 220, 303 to the Proxy Mobile Agent 210.

In one embodiment of the invention, the NAS signalling is encrypted using the derived keying information.

In an embodiment, the earlier mentioned access point or the e-Node B (according to the LTE enhanced 3GPP mobile telecommunications network) can be replaced by a base station, an Access Router, an IPsec gateway, a relay station of a wireless ad hoc network, a Node-B network element of a 3G mobile telecommunications network, or the like.

In an embodiment, the user data gateway may comprise a User Plane Entity of a LTE enhanced 3GPP mobile telecommunications network.

In an embodiment, a home system architecture evolution gateway comprises a home agent. In another embodiment, a home system architecture evolution gateway comprises a User Plane Entity.

The exemplary embodiments can include, for example, any suitable servers, workstations, and the like, capable of performing the processes of the exemplary embodiments. The devices and subsystems of the exemplary embodiments can communicate with each other using any suitable protocol and can be implemented using one or more programmed computer systems or devices.

One or more interface mechanisms can be used with the exemplary embodiments, including, for example, Internet access, telecommunications in any suitable form (e.g., voice, modem, and the like), wireless communications media, and the like. For example, employed communications networks or links can include one or more wireless communications networks, cellular communications networks, 3G communications networks, 3G communications networks enhanced with LTE technology (Long Term Evolution), 3G communications networks enhanced with SAE technology (System Architecture Evolution), Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware and/or software art(s). For example, the functionality of one or more of the components of the exemplary embodiments can be implemented via one or more hardware and/or software devices.

The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be conveniently implemented using one or more general purpose processors, microprocessors, digital signal processors, micro-controllers, and the like, programmed according to the teachings of the exemplary embodiments of the present inventions, as will be appreciated by those skilled in the computer and/or software art(s). Appropriate software can be readily prepared by programmers of ordinary skill based on the teachings of the exemplary embodiments, as will be appreciated by those skilled in the software art. In addition, the exemplary embodiments can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware and/or software.

Stored on any one or on a combination of computer readable media, the exemplary embodiments of the present inventions can include software for controlling the components of the exemplary embodiments, for driving the components of the exemplary embodiments, for enabling the components of the exemplary embodiments to interact with a human user, and the like. Such software can include, but is not limited to, device drivers, firmware, operating systems, development tools, applications software, and the like. Such computer readable media further can include the computer program product of an embodiment of the present inventions for performing all or a portion (if processing is distributed) of the processing performed in implementing the inventions. Computer code devices of the exemplary embodiments of the present inventions can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the exemplary embodiments of the present inventions can be distributed for better performance, reliability, cost, and the like.

As stated above, the components of the exemplary embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computerreadable media can include, for example, a floppy disk, a flexible disk, hard disk, magnetic tape, any other suitable magnetic medium, a CD-ROM, CDR, CD-RW, DVD, DVD-ROM, DVD±RW, DVD±R, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of exemplary embodiments, and implementations, the present inventions are not so limited, but rather cover various modifications, and equivalent arrangements, which fall within the purview of prospective claims.

What is claimed is:

1. A method, comprising:
   receiving, at a first apparatus, a long term key from an authentication server;
   receiving, at the first apparatus, a signed update message, the signed update message comprising a signature of an update message signing key,
   where the signed update message relates to a user terminal;
   in response to receiving the signed update message, deriving, by a processor of the first apparatus, an authentication key based at least in part on the long term key; and
   verifying, by the first apparatus, the authenticity of the received signed update message by comparing the received signature of the update message signing key with a signature of the authentication key.

2. The method according to claim 1, where the first apparatus is a home agent.

3. The method according to claim 1, where the first apparatus is a local data gateway.

4. The method according to claim 1, where the authentication server is a home authentication, authorization and accounting server.

5. The method according to claim 1, where the authentication server is a mobility management element.

6. The method according to claim 1, where deriving said authentication key is further based on a key derivation function and an identity of the user terminal.

7. The method according to claim 6, wherein the identity of the user terminal is a temporary mobile subscriber identity.

8. The method according to claim 1, further comprising: receiving the signed update message from one of a first access point and a first mobile node.

9. The method according to claim 1, further comprising: receiving the signed update message from a local data gateway.

10. The method according to claim 1, wherein the signed update message is a binding update message.

11. The method according to claim 1, wherein the signed update message is a location update message.

12. The method according to claim 1, where comparing the received signature of the update message signing key with a signature of the authentication key comprises determining whether the received signature of the update message signing key matches the signature of the authentication key, and in response to determining that the received signature of the update message signing key matches the signature of the authentication key, the authenticity of the received signed update message is verified.

13. The method according to claim 1, further comprising, in response to verifying the authenticity of the received signed update message, sending, from the first apparatus, an acknowledgement message.

14. An apparatus, comprising at least one processor; and at least one memory including computer program code, the at least one memory and the computer program code configured to, with the at least one processor, cause the apparatus to perform at least the following:

to receive a long term key from an authentication server;

to receive a signed update message, the signed update message comprising a signature of an update message signing key, where the signed update message relates to a user terminal;

to derive an authentication key based at least in part on the long term key in response to receiving the signed update message; and to verify the authenticity of the received signed update message by comparing the received signature of the update message signing key with a signature of the authentication key.

15. The apparatus according to claim 14, wherein the apparatus is a home agent.

16. The apparatus according to claim 14, wherein the apparatus is a local data gateway.

17. The apparatus according to claim 14, wherein the at least one memory and the computer program code are further configured to cause the apparatus to derive a new authentication key for each connecting user terminal.

18. The apparatus according to claim 14, wherein the at least one memory and the computer program code are further configured to cause the apparatus to derive the authentication key further based on a key derivation function and an identity of the user terminal.

19. The apparatus according to claim 18, wherein the identity of the user terminal is a temporary mobile subscriber identity.

20. The apparatus according to claim 14, where the at least one memory and the computer program code are further configured to cause the apparatus to receive the signed update message from one of: a first access point, a second access point, a first mobile node, a second mobile node, a first local data gateway and a second local data gateway.

21. The apparatus according to claim 14, wherein the signed update message is a binding update message.

22. The apparatus according to claim 14, wherein the signed update message is a location update message.

23. The apparatus according to claim 14, wherein the apparatus is embodied in a home system architecture evolution gateway server.

24. A non-transitory computer readable medium tangibly encoded with a computer program executable by a processor to perform actions comprising:

receiving a long term key from an authentication server;

receiving a signed update message, the signed update message comprising a signature of an update message signing key, where the signed update message relates to a user terminal;

in response to receiving the signed update message, deriving an authentication key based at least in part on the long term key; and verifying the authenticity of the received signed update message by comparing the received signature of the update message signing key with a signature of the authentication key.

25. The computer readable medium according to claim 24, where deriving said authentication key is further based on a key derivation function and an identity of the user terminal.

26. The computer readable medium according to claim 25, wherein the identity of the user terminal is a temporary mobile subscriber identity.

27. The computer readable medium according to claim 24, further comprising: receiving the signed update message from one of a first access point, a first mobile node and a local data gateway.

28. The computer readable medium according to claim 24, wherein the signed update message is a binding update message.

29. The computer readable medium according to claim 24, wherein the signed update message is a location update message.

* * * * *